US012597299B2

(12) United States Patent　　　　(10) Patent No.:　US 12,597,299 B2
Clément et al.　　　　　　　　　　　(45) Date of Patent:　　　Apr. 7, 2026

(54) SYSTEM AND METHOD FOR REPOSITIONING VEHICLES IN A GEOGRAPHIC AREA BASED ON UTILIZATION METRIC

(71) Applicant: Lyft, Inc., San Francisco, CA (US)

(72) Inventors: Romain Clément, Campbell, CA (US); Joseph Patrick Wendell Whinnery, Scotts Valley, CA (US)

(73) Assignee: Lyft, Inc., San Francisco, CA (US)

( * ) Notice: Subject to any disclaimer, the term of this patent is extended or adjusted under 35 U.S.C. 154(b) by 657 days.

(21) Appl. No.: 17/881,545

(22) Filed: Aug. 4, 2022

(65) Prior Publication Data

US 2022/0375278 A1　　　Nov. 24, 2022

Related U.S. Application Data

(63) Continuation of application No. 16/370,705, filed on Mar. 29, 2019, now Pat. No. 11,423,710.

(51) Int. Cl.
| | |
|---|---|
| *G06Q 10/0631* | (2023.01) |
| *G01S 17/42* | (2006.01) |
| *G01S 17/86* | (2020.01) |
| *G07C 5/08* | (2006.01) |

(52) U.S. Cl.
CPC ........... *G07C 5/0808* (2013.01); *G01S 17/42* (2013.01); *G01S 17/86* (2020.01); *G06Q 10/06311* (2013.01)

(58) Field of Classification Search
None
See application file for complete search history.

(56) References Cited

U.S. PATENT DOCUMENTS

| | | | |
|---|---|---|---|
| 10,002,394 B1 | 6/2018 | Owens et al. | |
| 10,360,518 B2 | 7/2019 | Hirose et al. | |
| 10,395,332 B1 | 8/2019 | Konrardy et al. | |
| 2004/0054561 A1 | 3/2004 | Ogura et al. | |
| 2010/0228405 A1 | 9/2010 | Morgal et al. | |
| 2010/0245128 A1 | 9/2010 | Kanof | |
| 2011/0010300 A1 | 1/2011 | Audet | |
| 2015/0379480 A1 | 12/2015 | Taplan | |
| 2016/0162742 A1 | 6/2016 | Rogan | |
| 2016/0196701 A1 | 7/2016 | Strother et al. | |
| 2017/0124476 A1* | 5/2017 | Levinson | G06V 20/58 |
| 2018/0101179 A1* | 4/2018 | Louey | B60L 50/52 |
| 2018/0188045 A1 | 7/2018 | Wheeler et al. | |
| 2018/0319368 A1* | 11/2018 | Keating | G08G 1/005 |

(Continued)

*Primary Examiner* — James J Lee
*Assistant Examiner* — Tawri M McAndrews
(74) *Attorney, Agent, or Firm* — Sheppard Mullin Richter & Hampton LLP

(57) ABSTRACT

A computer-implemented method is disclosed for managing personal mobility vehicles (PMVs) across a geographic region. One or more sensor-equipped vehicles traverse the region and collect sensor data, which is used by a computing system to determine the respective state and location of PMVs. Based on these determinations, the system generates a utilization value for the PMVs and compares it to a predefined utilization metric reflecting desired deployment levels. The system then provides instructions to reposition PMVs within the region to satisfy the utilization metric, enabling automated, demand-responsive fleet balancing and reduced reliance on manual monitoring.

20 Claims, 8 Drawing Sheets

(56) References Cited

U.S. PATENT DOCUMENTS

| | | | |
|---|---|---|---|
| 2019/0005726 A1 | 1/2019 | Nakano et al. | |
| 2019/0068434 A1 | 2/2019 | Moreira da Mota | |
| 2019/0248439 A1 | 8/2019 | Wang | |
| 2019/0304204 A1 | 10/2019 | Gao et al. | |
| 2019/0369203 A1 | 12/2019 | Zysk, Jr. et al. | |
| 2020/0025935 A1 | 1/2020 | Liang et al. | |
| 2020/0073405 A1 | 3/2020 | Xu et al. | |
| 2020/0184825 A1 | 6/2020 | Bruhn | |
| 2021/0349465 A1* | 11/2021 | Gillett | B60K 35/10 |
| 2022/0005358 A1* | 1/2022 | Haghighat Kashani | B60W 60/0011 |

* cited by examiner

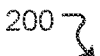
200
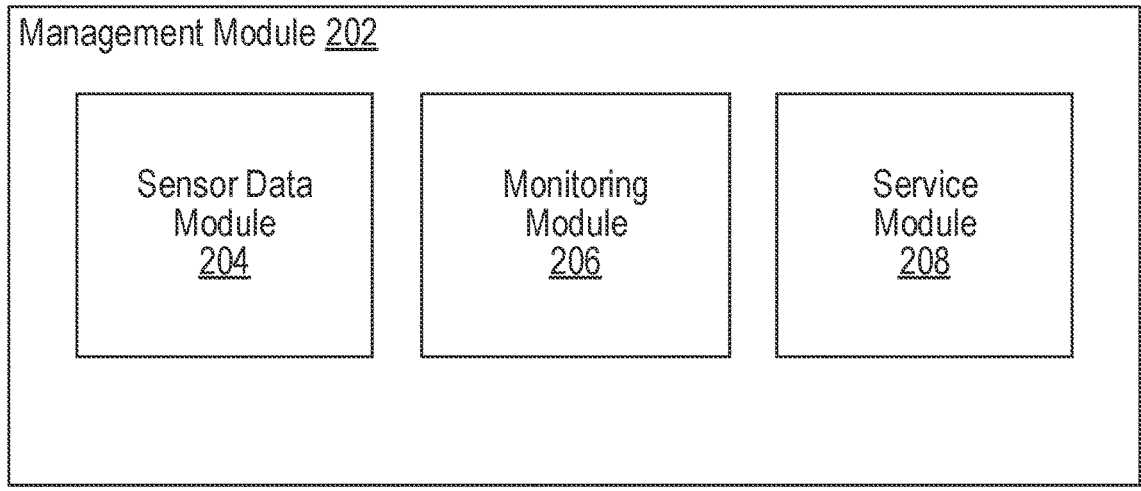
Management Module 202
| Sensor Data Module 204 | Monitoring Module 206 | Service Module 208 |
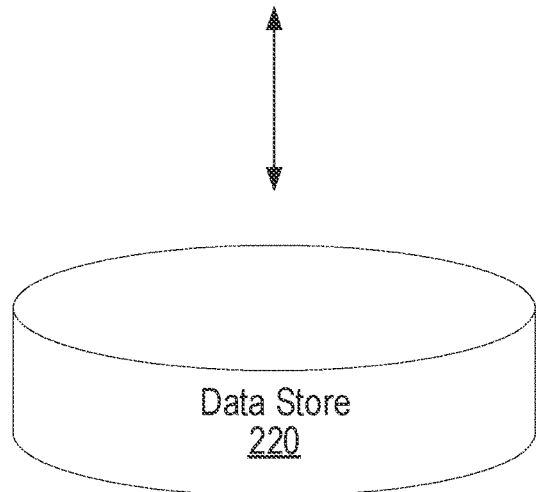
Data Store 220
FIGURE 2

400

402

406

404

410

Transportation
Management System
412

FIGURE 4

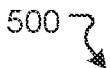

500

Determine sensor data collected by a fleet of vehicles while
navigating a geographic region
502

Determine information describing respective states of a plurality of
alternative transportation vehicles in the geographic region based
at least in part on the sensor data
504

Determine one or more operations for managing the alternative
transportation vehicles
506

SYSTEM AND METHOD FOR REPOSITIONING VEHICLES IN A GEOGRAPHIC AREA BASED ON UTILIZATION METRIC

CROSS-REFERENCE TO RELATED APPLICATIONS

This application is a continuation of U.S. patent application Ser. No. 16/370,705, filed on Mar. 29, 2019 and entitled "APPROACHES FOR MANAGING VEHICLES", which is incorporated in its entirety herein by reference.

FIELD OF THE INVENTION

The present technology relates to the field of vehicles. More particularly, the present technology relates to systems, apparatus, and methods for monitoring and managing a fleet of personal mobility vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine sensor data collected by a fleet of vehicles while navigating a geographic region. Information describing respective states of a plurality of personal mobility vehicles in the geographic region can be determined based at least in part on the sensor data. One or more operations for managing the personal mobility vehicles can be determined.

In an embodiment, the sensor data includes at least one of image data collected using one or more optical cameras and point cloud data collected using one or more Light Detection And Ranging (LiDAR) sensors.

In an embodiment, determining information describing respective states of the plurality of personal mobility vehicles further includes determining that a personal mobility vehicle is obstructing pedestrian traffic based at least in part on a determination by a vehicle in the fleet of vehicles and associating the personal mobility vehicle with a nuisance state.

In an embodiment, determining information describing respective states of the plurality of personal mobility vehicles further includes determining that a personal mobility vehicle is obstructing road traffic based at least in part on a determination by a vehicle in the fleet of vehicles and associating the personal mobility vehicle with a hazard state.

In an embodiment, determining information describing respective states of the plurality of personal mobility vehicles further includes determining that a personal mobility vehicle is damaged based at least in part on a determination by a vehicle in the fleet of vehicles and associating the personal mobility vehicle with an inoperable state.

In an embodiment, determining one or more operations for managing the personal mobility vehicles further includes providing a notification to dispatch authorized personnel to retrieve one or more of the personal mobility vehicles.

In an embodiment, retrieval of the personal mobility vehicles is prioritized based at least in part on their respective states.

In an embodiment, determining one or more operations for managing the personal mobility vehicles further includes determining a utilization metric measuring utilization of the personal mobility vehicles in the geographic region.

In an embodiment, the systems, methods, and non-transitory computer readable media are configured to provide a notification to dispatch authorized personnel to pre-position one or more additional personal mobility vehicles at the geographic region based at least in part on the utilization metric.

In an embodiment, the systems, methods, and non-transitory computer readable media are configured to provide a notification to dispatch authorized personnel to remove one or more of the personal mobility vehicles from the geographic region based at least in part on the utilization metric.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 2 illustrates an example management module, according to an embodiment of the present technology.

FIG. 4 illustrates an example diagram, according to an embodiment of the present technology.

FIG. 5 illustrates an example method, according to an embodiment of the present technology.

Figure 1A:
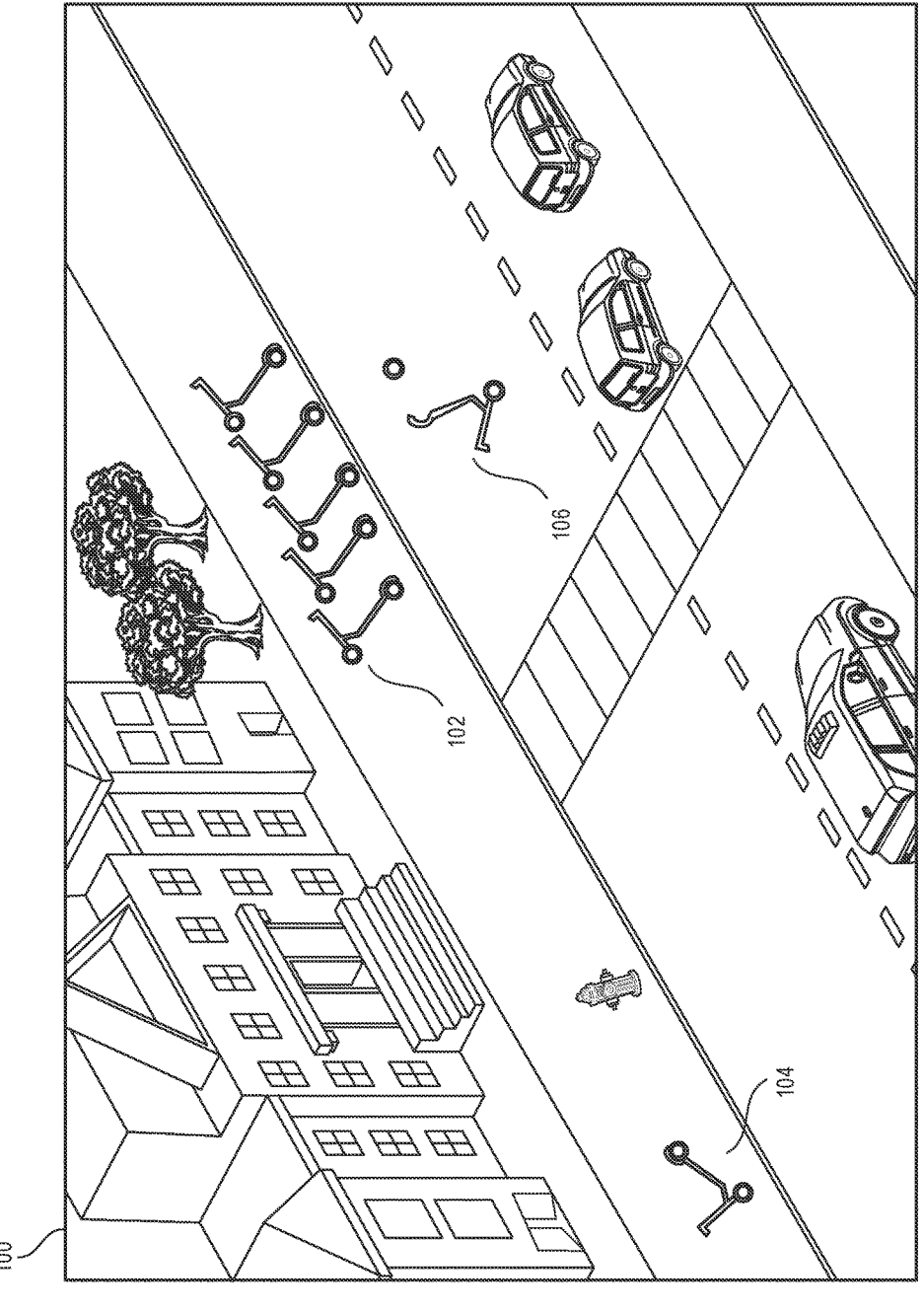
FIGS. 1A-1B illustrate various challenges that may be experienced when managing a fleet of personal mobility vehicles, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

An organization may deploy assets such as personal mobility vehicles (e.g., e-bikes, scooters, etc.) across various geographic regions. These personal mobility vehicles are typically not capable of monitoring themselves and their surroundings. For example, the personal mobility vehicles may lack various systems and subsystems (e.g., sensors) needed to accurately sense an environment and objects within the environment. Conventional approaches for monitoring such personal mobility vehicles typically involve authorized personnel (i.e., humans) manually locating personal mobility vehicles throughout various geographic regions based on their reported global positioning system (GPS) information. The authorized personnel can also be tasked with determining respective states of personal mobility vehicles and performing various actions based on those states. For example, a human can visually identify a personal mobility vehicle that is physically damaged and can perform actions to retrieve and repair the personal mobility vehicle. Such conventional approaches are undesirable for many reasons. For example, conventional approaches are undesirable given the amount of human effort that is needed to monitor a growing fleet of personal mobility vehicles. Although the examples herein discuss management of personal mobility vehicles, the approaches described may be applied to monitor and manage any mobile asset regardless of whether that asset is used for transportation.

FIG. 1A illustrates various challenges that may be experienced when managing a fleet of personal mobility vehicles. For example, FIG. 1A illustrates one example environment 100 in which a fleet of personal mobility vehicles 102 (e.g., e-bikes, e-scooters, hoverboards, skateboards, etc.) may be deployed. Under conventional approaches, humans are typically tasked with managing the fleet of personal mobility vehicles 102. For example, authorized personnel may be tasked with retrieving abandoned personal mobility vehicles 104 and docking them at a pickup location or charging station. In another example, authorized personnel may be tasked with retrieving damaged or inoperable personal mobility vehicles 106 and hauling them away for servicing. Such conventional approaches generally require a dedicated team of individuals that travel across geographic regions to individually monitor and manage personal mobility vehicles. However, as mentioned, such conventional approaches are generally not capable of effectively managing a fleet of personal mobility vehicles especially as deployment of personal mobility vehicles continues to increase across geographic regions.

Figure 1B:
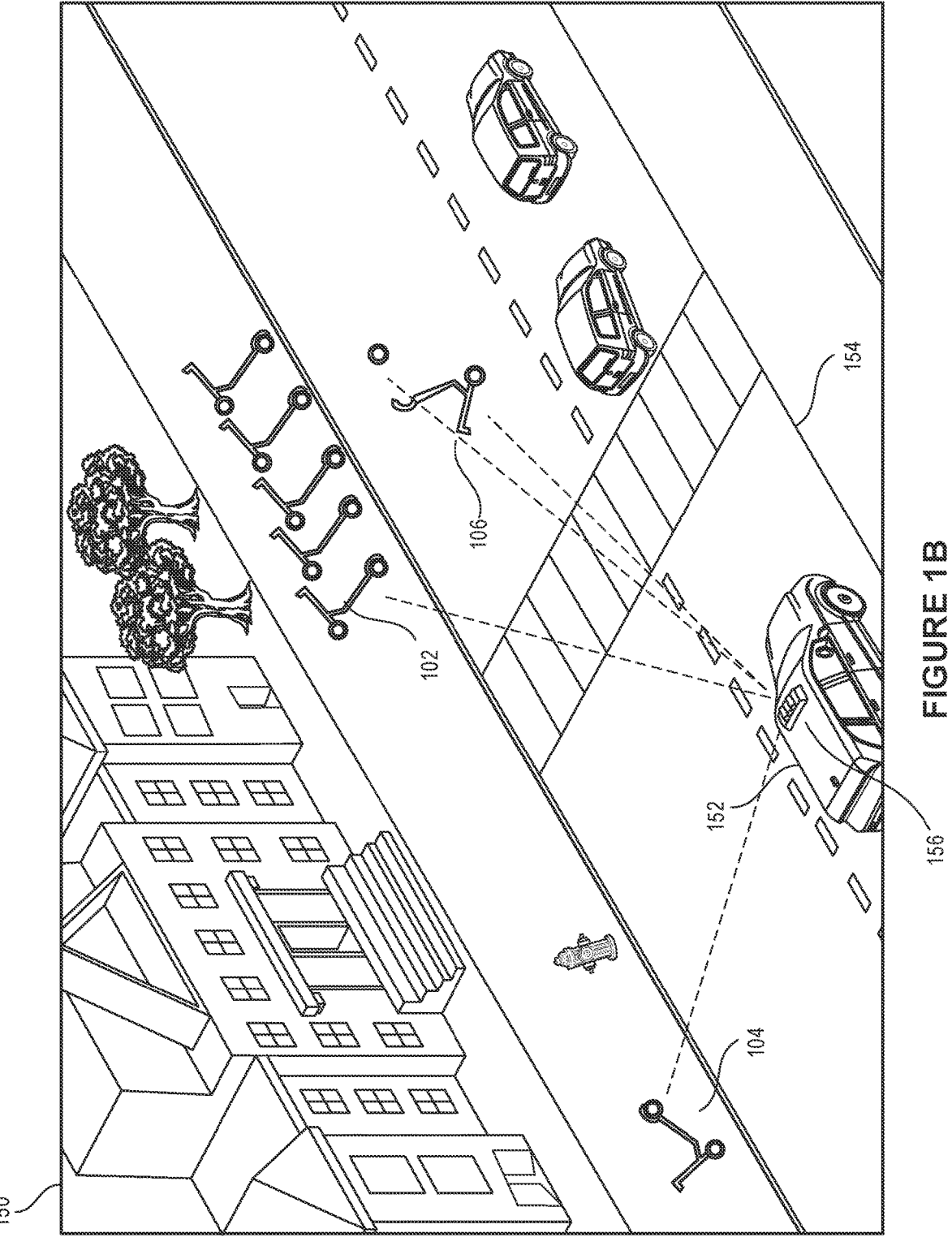
Figure 6:
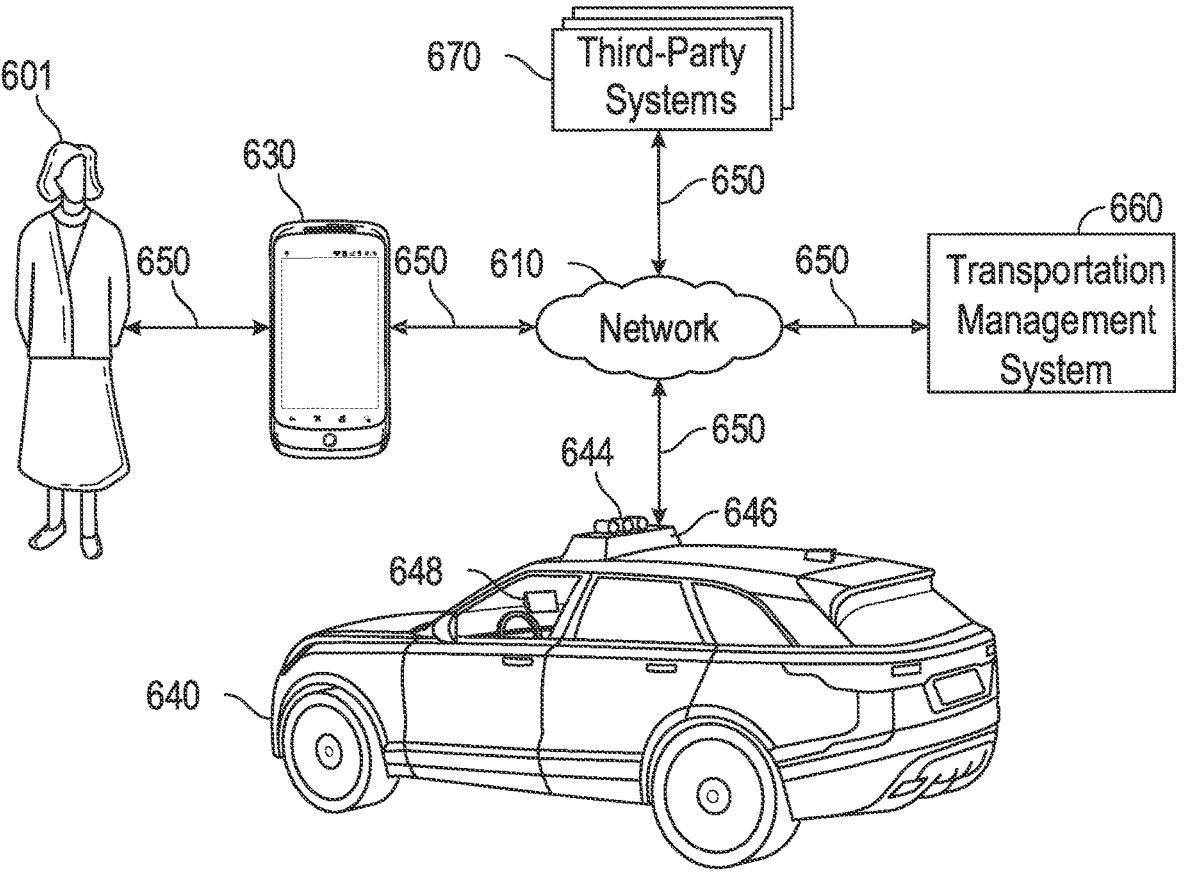
FIG. 6 illustrates an example block diagram of a transportation management environment, according to an embodiment of the present technology.

An improved approach in accordance with the present technology overcomes the foregoing and other disadvantages associated with conventional approaches. The improved approach can employ a fleet of vehicles that offer ridesharing or other transportation related services to manage personal mobility vehicles. The fleet of vehicles, whether autonomously, semi-autonomously, or manually driven, may be capable of sensing their environment and navigating with little or no human input. In general, such vehicles may be equipped with one or more sensors that can be used to capture environmental information, such as information describing a given road and objects present on or along the road. For example, in some instances, a vehicle may be equipped with one or more sensors in a sensor suite including optical cameras, LiDAR, radar, infrared cameras, and ultrasound equipment, to name some examples. Such sensors can be used to collect information that can be used by the vehicle to understand its environment and objects within the environment. In various embodiments, such vehicles can be used to monitor geographic locations of personal mobility vehicles and their respective states. For example, FIG. 1B illustrates an example environment 150 in which a vehicle 152 is navigating a road 154. The vehicle 152 can be, for example, a vehicle 640 as shown in FIG. 6. In FIG. 1B, the vehicle 152 includes a sensor suite 156 that can be used to sense static (or stationary) objects, dynamic objects (e.g., objects in motion), and semi-permanent (or ephemeral) objects that are around (or within some threshold proximity of) the vehicle 152. In the example of FIG. 1B, the vehicle 152 can analyze various sensor data to identify personal mobility vehicles being managed, such as the personal mobility vehicles 102. In various embodiments, the vehicle 152 can also determine respective states of personal mobility vehicles. For example, based on sensor data, the vehicle 152 can determine that a personal mobility vehicle 104 was abandoned on a sidewalk. In another example, based on sensor data, the vehicle 152 can determine that a personal mobility vehicle 106 is damaged and in need of repair. In various embodiments, the vehicle 152 can store information describing personal mobility vehicles along with their respective geographic locations and states. In some embodiments, this information can be communicated to a transportation management system (e.g., the transportation management system 660 of FIG. 6). The transportation management system can use this information to perform various operations to manage the fleet of personal mobility vehicles across geographic regions. For example, the transportation management system may determine that some geographic locations experience higher demand for personal mobility vehicles at particular times of the day. In this example, the transportation management system can provide notifications to dispatch authorized personnel to pre-position personal mobility vehicles at those geographic locations in anticipation of the higher demand. More details relating to the present technology are provided below.

FIG. 2 illustrates an example system 200 including an example management module 202, according to an embodiment of the present technology. As shown in the example of FIG. 2, the management module 202 can include a sensor data module 204, a monitoring module 206, and a service module 208. In some instances, the example system 200 can include at least one data store 220. In some embodiments, some or all of the functionality performed by the management module 202 and its sub-modules may be performed by one or more backend computing systems, such as the transportation management system 660 of FIG. 6. In some embodiments, some or all of the functionality performed by the management module 202 and its sub-modules may be performed by one or more computing systems implemented in a vehicle, such as the vehicle 640 of FIG. 6. The management module 202 can be configured to communicate and operate with the at least one data store 220. The at least one data store 220 can be configured to store and maintain various types of data. For example, the data store 220 can store information describing personal mobility vehicles along with their respective geographic locations and states. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The sensor data module 204 can be configured to access sensor data captured by vehicles. For example, the sensor data may include data captured by one or more sensors including optical cameras, LiDAR, radar, infrared cameras, and ultrasound equipment, to name some examples. The sensor data module 204 can obtain such sensor data, for example, from the data store 220 or directly from sensors associated with a vehicle in real-time (or near real-time). In some instances, the obtained sensor data may have been collected by a fleet of vehicles that offer ridesharing or other transportation related services. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

The monitoring module 206 can be configured to monitor personal mobility vehicles. For example, the monitoring module 206 can determine the presence of personal mobility vehicles in a given environment based on sensor data captured by sensors of a vehicle while navigating the environment. In various embodiments, the monitoring module 206 can apply various content processing techniques to identify personal mobility vehicles and determine their respective states. More details regarding the monitoring module 206 will be provided below with reference to FIG. 3.

The service module 208 can be configured to perform various operations and provide various notifications based on states determined for personal mobility vehicles. For example, in various embodiments, the service module 208 can provide information describing geographic locations of identified personal mobility vehicles and their corresponding states to a transportation management system (e.g., the transportation management system 660 of FIG. 6). The transportation management system may use this information to perform various operations for managing the personal mobility vehicles. In some embodiments, states associated with personal mobility vehicles can be used to prioritize such efforts. For example, the transportation management system may provide notifications to dispatch authorized personnel to prioritize management of personal mobility vehicles that are categorized in a hazard state over personal mobility vehicles categorized in a nuisance or inoperable state. In some embodiments, the transportation management system may prioritize notifications to dispatch authorized personnel to manage personal mobility vehicles based on a severity of states associated with multiple personal mobility vehicles. For example, a geographic region that includes a threshold number of personal mobility vehicles associated with a hazard state can be prioritized for dispatch of authorized personnel over other geographic regions that do not satisfy this criteria. In some embodiments, the transportation management system can determine a utilization metric that measures a utilization of personal mobility vehicles in a given geographic region. For example, sensor data collected by a fleet of vehicles while navigating the geographic region can be used to determine a utilization metric for the personal mobility vehicles. In some embodiments, the utilization metric can be used to provide notifications to pre-position personal mobility vehicles at the geographic region or to remove personal mobility vehicles from the geographic region for fleet balancing purposes. In some embodiments, sensor data collected by the fleet of vehicles can be used to determine respective utilization metrics for personal mobility vehicles associated with different brands (or distributors). In some embodiments, the transportation management system can determine information describing designated locations at which personal mobility vehicles are parked (e.g., charging stations, vehicle storage racks, etc.). For example, sensor data collected by a fleet of vehicles when driving past a designated location can be used to determine a number of personal mobility vehicles parked at the designated location and a number of parking spaces remaining at the designated location. In some instances, such information can be used to identify issues at the designated location. In some embodiments, the transportation management system can route autonomous, semi-autonomous, or manually driven vehicles through certain geographic regions to conduct reconnaissance on personal mobility vehicles. For example, the transportation management system may route a vehicle through a first road instead of a second road to conduct reconnaissance on personal mobility vehicles that were last determined to be located along the first road. In some embodiments, the transportation management system can determine information describing locations of personal mobility vehicles associated with different brands (or distributors). In some embodiments, such information can be used to determine concentrations of personal mobility vehicles in a geographic region. Such concentrations may be used to strategically position personal mobility vehicles in the geographic region so that a desired concentration or number of personal mobility vehicles can be available in the geographic region.

Figure 3:
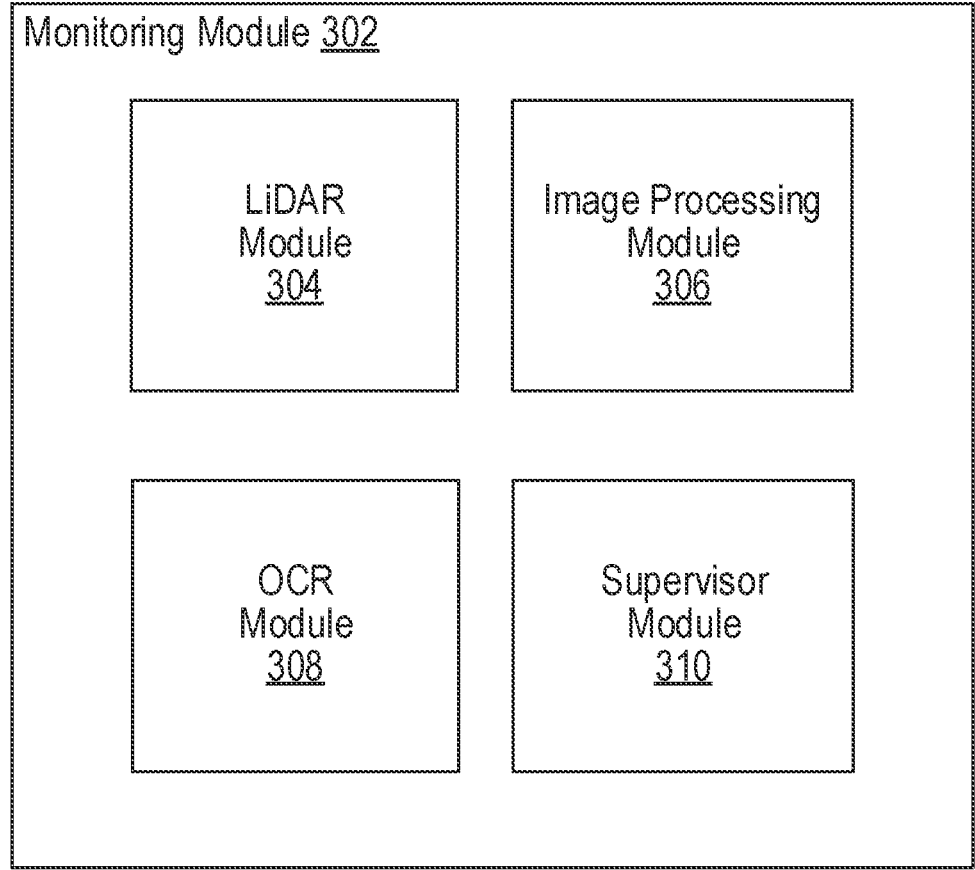
FIG. 3 illustrates an example monitoring module, according to an embodiment of the present technology.

FIG. 3 illustrates an example monitoring module 302, according to an embodiment of the present technology. In some embodiments, the monitoring module 206 of FIG. 2 can be implemented with the monitoring module 302. The monitoring module 302 can be configured to identify and monitor respective states of personal mobility vehicles. For example, the monitoring module 302 can identify personal mobility vehicles based on sensor data captured by an autonomous, semi-autonomous, or manually driven vehicle. The vehicle from which the sensor data is obtained may be included in a fleet of vehicles that offer ridesharing or other transportation related services. As shown in the example of FIG. 3, the monitoring module 302 can include a LiDAR module 304, an image processing module 306, an OCR module 308, and a supervisor module 310.

The LiDAR module 304 can identify personal mobility vehicles located on or alongside a road based on LiDAR data collected while driving the road. For example, the LiDAR module 304 can access one or more point clouds generated based on LiDAR data collected while driving the road. A point cloud can include a collection of data points in space that provide a three-dimensional representation of an environment and objects within the environment. In various embodiments, the LiDAR module 304 can analyze features associated with objects represented in one or more point clouds to determine whether any of those objects correspond to a personal mobility vehicle. In some embodiments, the LiDAR module 304 can also determine respective states for identified personal mobility vehicles. For example, the LiDAR module 304 can analyze features associated with an identified personal mobility vehicle as represented in one or more point clouds to determine a state of the alternative transportation vehicle. For example, in some embodiments, a personal mobility vehicle may be categorized in an active state, an inoperable state, a nuisance state, or a hazard state. Many variations are possible. For example, in some embodiments, personal mobility vehicles that are being used can be categorized in an active state. For example, the LiDAR module 304 can categorize personal mobility vehicles that were identified as having one or more riders in an active state. In some embodiments, a personal mobility vehicle may be categorized in an inoperable state upon determining the personal mobility vehicle is damaged or otherwise inoperable. For example, in some embodiments, the LiDAR module 304 can determine a personal mobility vehicle is physically damaged by determining an amount of deviation between the personal mobility vehicle represented in point cloud data and a ground truth representation of the alternative transportation vehicle. In such embodiments, the LiDAR module 304 can categorize the personal mobility vehicle in an inoperable state when a threshold level of deviation is determined between the representation of the personal mobility vehicle in the point cloud data and its corresponding ground truth representation. In some embodiments, a personal mobility vehicle may be categorized in a nuisance state upon determining the personal mobility vehicle is not parked at a designated (or pre-determined) geographic location (e.g., a charging station, vehicle storage rack, etc.). For example, a personal mobility vehicle obstructing pedestrian traffic (e.g., obstructing a sidewalk entrance) can be identified as a potential nuisance and can be categorized accordingly. In some embodiments, a personal mobility vehicle may be categorized in a nuisance state upon determining that an orientation of the personal mobility vehicle deviates from an intended orientation of the personal mobility vehicle. For example, the LiDAR module 304 can categorize a personal mobility vehicle in a nuisance state upon determining the personal mobility vehicle is not parked in an upright position. In some embodiments, a personal mobility vehicle may be categorized in a hazard state upon determining the personal mobility vehicle is creating a public safety hazard. For example, a personal mobility vehicle determined to be obstructing road traffic can be identified and categorized in the hazard state. Many variations are possible. In some embodiments, the LiDAR module 304 can generate and maintain an association between an identified personal mobility vehicle along with information describing its geographic location and corresponding state. In some embodiments, the LiDAR module 304 can be implemented as one or more machine learning models that can be trained and refined over time as additional LiDAR data is collected and analyzed.

The image processing module 306 can identify personal mobility vehicles located on or alongside a road based on image (or video) data collected while driving the road. For example, the image processing module 306 can apply generally known image segmentation techniques to partition an image into discrete segments. Each discrete segment can include pixels that share one or more characteristics such as color, intensity, or texture. These discrete segments can be used to visualize meaningful boundaries between objects represented in images. In some embodiments, such boundaries can be used to identify personal mobility vehicles represented in image data. In some embodiments, the image processing module 306 can also determine respective states for identified personal mobility vehicles. For example, the image processing module 306 can analyze features associated with an identified personal mobility vehicle as represented in image data to determine a state of the alternative transportation vehicle. In some embodiments, a personal mobility vehicle may be categorized in an active state, an inoperable state, a nuisance state, or a hazard state, as described above. In some embodiments, the image processing module 306 can generate and maintain an association between an identified personal mobility vehicle along with information describing its geographic location and corresponding state. In some embodiments, the image processing module 306 can be implemented as one or more machine learning models that can be trained and refined over time as additional image data (or video data) is collected and analyzed. In some embodiments, the image processing module 306 can be used in conjunction with the LiDAR module 304 to identify personal mobility vehicles. For example, segmentation data produced by the image processing module 306 can be overlaid with one or more point clouds determined by the LiDAR module 304 to identify personal mobility vehicles.

The OCR module 308 can identify personal mobility vehicles located on or alongside a road based on image (or video) data collected while driving the road. For example, the OCR module 308 can apply generally known OCR techniques to convert text represented in image data to machine-readable text. In some embodiments, personal mobility vehicles can be identified and distinguished based on a typography (e.g., a style; arrangement; appearance of letters, numbers, and symbols) of text recognized on or in association with personal mobility vehicles. For example, the OCR module 308 can apply generally known OCR techniques to identify text represented on a personal mobility vehicle. The text may identify a brand (or distributor) of the alternative transportation vehicle. In this example, personal mobility vehicles with different typography can be distinguished from one another. In some embodiments, the OCR module 308 can generate and maintain an association between an identified personal mobility vehicle along with information describing its geographic location and corresponding brand (or distributor). In some embodiments, the OCR module 308 can be implemented as one or more machine learning models that can be trained and refined over time as additional image data is collected and analyzed.

In various embodiments, the LiDAR module 304, the image processing module 306, and the OCR module 308 can be used in parallel to monitor personal mobility vehicles. For example, in some embodiments, the LiDAR module 304, the image processing module 306, and the OCR module 308 can be implemented as individual machine learning models trained to predict a presence of personal mobility vehicles and their corresponding states based on sensor data. In such embodiments, the supervisor module 310 can serve as a machine learning monitor that evaluates predictions made by the individual machine learning models. For example, each of the machine learning models can individually process sensor data corresponding to a given location. In this example, the supervisor module 310 can evaluate predictions made by each of the machine learning models to identify personal mobility vehicles at the location and determine their corresponding states. Many variations are possible.

Figure 4:
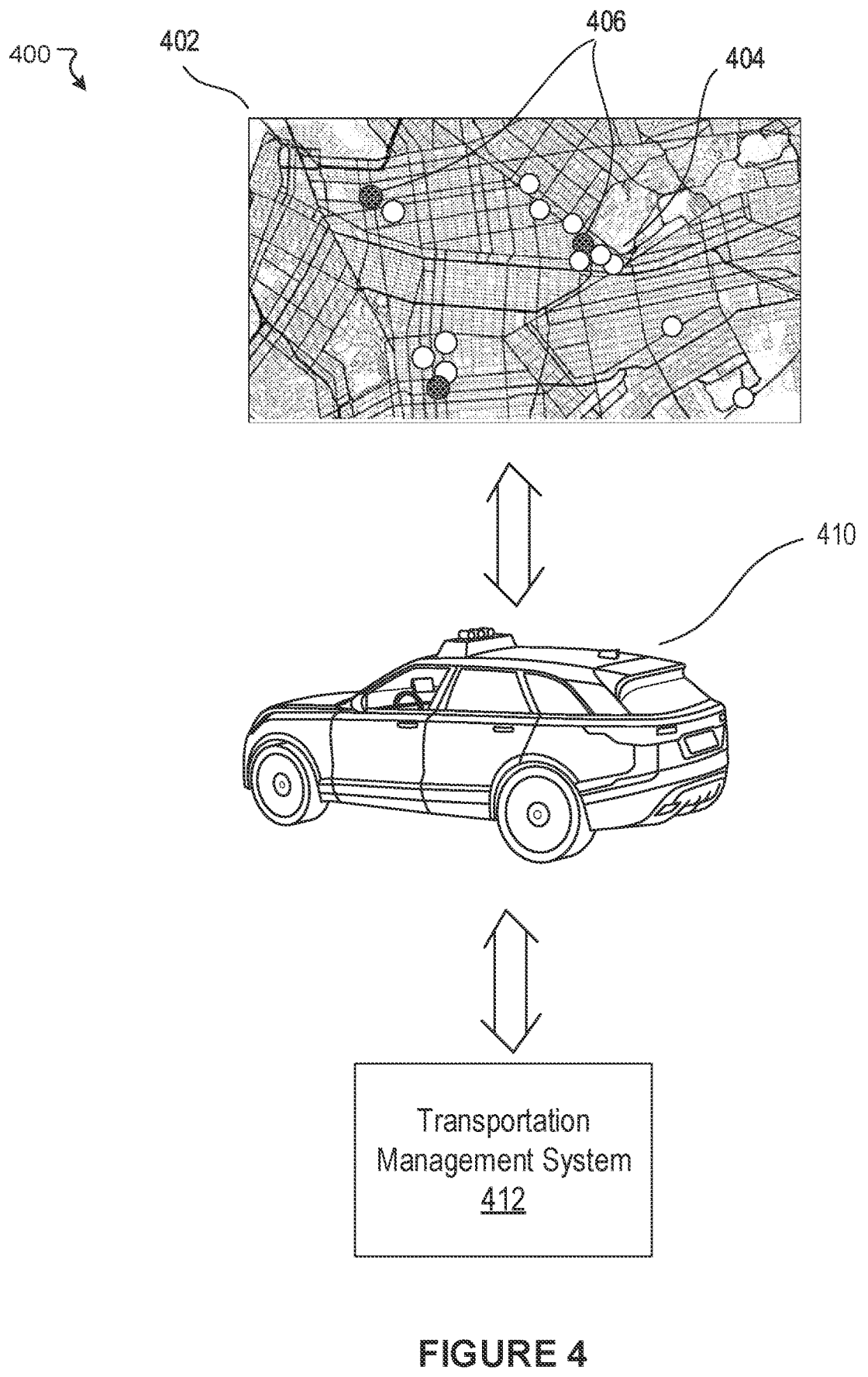

FIG. 4 illustrates an example diagram 400 of a map 402 of personal mobility vehicles identified in a geographic region based on functionality of the management module 202, according to an embodiment of the present technology.

The map 402 can be determined based on sensor data collected by a vehicle 410 while navigating the geographic region. The vehicle 410 can be, for example, the vehicle 640 as shown in FIG. 6. For example, in FIG. 4, sensor data captured by the vehicle 410 can be used to identify locations of personal mobility vehicles in real-time (or near real-time). The sensor data can also be used to determine respective states for identified personal mobility vehicles. In some embodiments, respective locations of identified personal mobility vehicles can be plotted in the map 402. In some embodiments, the map 402 can also label the plotted locations of the identified personal mobility vehicles based on their respective states. In the example of FIG. 4, the map 402 identifies locations of personal mobility vehicles 404 that were determined to be active. The map 402 also identifies locations of personal mobility vehicles 406 that were determined to be inoperable. In various embodiments, information describing the map 402 and the plotted locations of the identified personal mobility vehicles can be provided to a transportation management system 412. The transportation management system 412 can be, for example, the transportation management system 660 as shown in FIG. 6. In various embodiments, the transportation management system 412 can use information describing personal mobility vehicles along with their geographic locations and states to manage a fleet of personal mobility vehicles based on functionality of the service module 208. Many variations are possible.

FIG. 5 illustrates an example method 500, according to an embodiment of the present technology. At block 502, sensor data collected by a fleet of vehicles while navigating a geographic region can be determined. At block 504, information describing respective states of a plurality of personal mobility vehicles in the geographic region can be determined based at least in part on the sensor data. At block 506, one or more operations for managing the personal mobility vehicles can be determined. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the management module 202 may be implemented by one or more computing systems of the transportation management system 660. In some embodiments, some or all modules of the management module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, California, the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
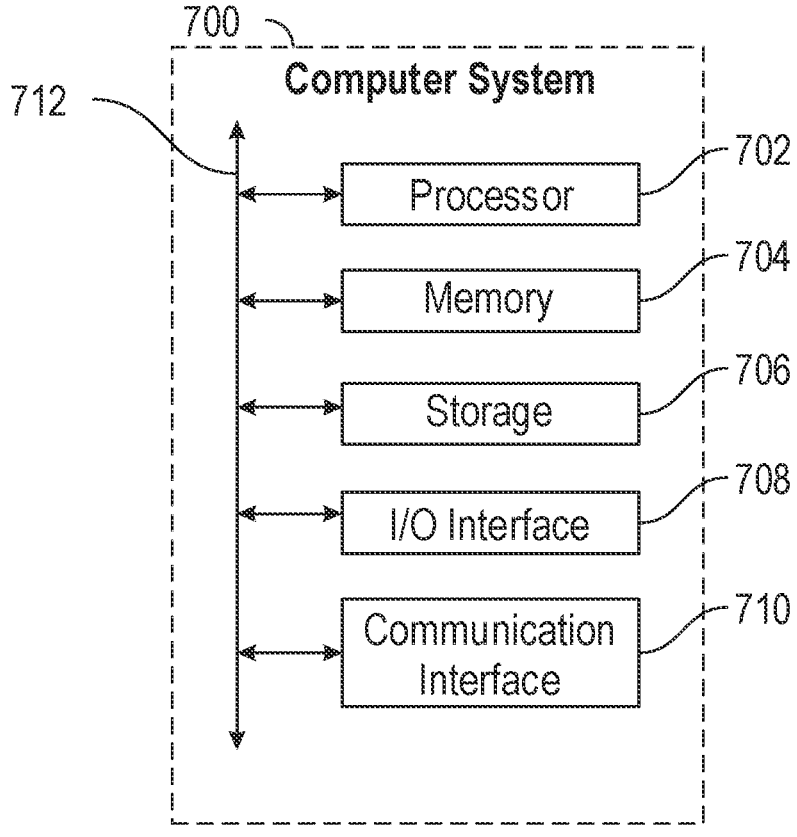
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WN IC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:

determining, by a computing system, respective states and respective locations of one or more personal mobility vehicles in a geographic region based on sensor data collected by one or more sensor-equipped vehicles;

determining, by the computing system, a utilization metric that measures utilization of the one or more personal mobility vehicles in the geographic region based on the respective states and respective locations;

generating, by the computing system, one or more predictions of utilization for the one or more personal mobility vehicles based on the respective states, the respective locations, and contextual information comprising a date, day of week, or time of day during which the sensor data was collected;

comparing, by the computing system, the one or more predictions of utilization with the utilization metric for repositioning the one or more personal mobility vehicles in the geographic region;

providing, by the computing system, one or more instructions to reposition the one or more personal mobility vehicles in the geographic region or to remove personal mobility vehicles from the geographic region for fleet balancing purposes; and providing, by the computing system, one or more routing instructions to route the one or more sensor-equipped vehicles to reconnaissance along a road on which the one or more personal mobility vehicles are determined to be located based on the sensor data.

2. The method of claim 1, further comprising:

determining, by the computing system, an issue associated with a designated location in the geographic region based on the sensor data; and providing, by the computing system, information associated with the issue to a transportation management system, wherein the transportation management system sends out notifications to reposition the one or more personal mobility vehicles based on the information.

3. The method of claim 1, further comprising:

providing, by the computing system, one or more instructions to the one or more sensor-equipped vehicles for routing through a portion of the geographic region to gather sensor data in the portion of the geographic region.

4. The method of claim 1, further comprising:

updating, by the computing system, a map of the geographic region based on the sensor data, wherein the updating the map comprises:

updating, by the computing system, the respective location of the one or more personal mobility vehicles in the map; and updating, by the computing system, a respective label of the one or more personal mobility vehicles in the map based on the respective state.

5. The method of claim 4, further comprising:

managing, by the computing system, the one or more personal mobility vehicles based on the updated map of the geographic region.

6. The method of claim 1, further comprising:

determining, by the computing system, designated locations for parking the one or more personal mobility vehicles; and determining, by the computing system, a number of personal mobility vehicles parked at the designated locations based on the sensor data, wherein the utilization metric is further based on a number of remaining locations among the designated locations for parking.

7. The method of claim 1, further comprising:

determining, by the computing system, a level of demand for personal mobility vehicles in the geographic region, wherein the utilization metric is further based on the level of demand.

8. The method of claim 1, wherein the utilization metric is associated with one or more concentrations of personal mobility vehicles in the geographic region, and wherein the one or more instructions cause the one or more personal mobility vehicles to reposition in the geographic region to achieve a selected concentration.

9. The method of claim 1, further comprising:

determining, by the computing system, a presence of one or more riders in the one or more personal mobility vehicles, wherein the respective states of the one or more personal mobility vehicles that have the one or more riders are determined to be active.

10. The method of claim 1, wherein the one or more instructions include notifications to reposition in the geographic region in anticipation of increased demand in the geographic region.

11. The method of claim 1, wherein determining the respective states comprises categorizing the one or more personal mobility vehicles into one of an active state, a hazard state, a nuisance state, or an inoperable state based on the sensor data.

12. The method of claim 1, wherein the sensor data indicates whether personal mobility vehicle obstructs road or pedestrian traffic, is not parked at a designated location, is not in an upright position, or is physically damaged.

13. A system comprising:

at least one processor; and a memory storing instructions that, when executed by the at least one processor, cause the system to perform:

determining respective states and respective locations of one or more personal mobility vehicles in a geographic region based on sensor data collected by one or more sensor-equipped vehicles;

determining a utilization metric that measures utilization of the one or more personal mobility vehicles in the geographic region based on the respective state and respective location;

generating one or more predictions of utilization for the one or more personal mobility vehicles based on the respective states, the respective locations, and contextual information comprising a date, day of week, or time of day during which the sensor data was collected;

comparing the one or more predictions of utilization with the utilization metric for repositioning the one or more personal mobility vehicles in the geographic region;

providing one or more instructions to reposition the one or more personal mobility vehicles in the geographic region or to remove personal mobility vehicles from the geographic region for fleet balancing purposes; and providing one or more routing instructions to route the one or more sensor-equipped vehicles to reconnaissance along a road on which the one or more personal mobility vehicles are determined to be located based on the sensor data.

14. The system of claim 13, wherein the instructions further cause the system to perform:

determining an issue associated with a designated location in the geographic region based on the sensor data; and providing information associated with the issue to a transportation management system, wherein the transportation management system sends out notifications to reposition the one or more personal mobility vehicles based on the information.

15. The system of claim 13, wherein the instructions further cause the system to perform:

providing one or more instructions to the one or more sensor-equipped vehicles for routing through a portion of the geographic region to gather sensor data in the portion of the geographic region.

16. The system of claim 13, wherein the instructions further cause the system to perform:

updating a map of the geographic region based on the sensor data, wherein the updating the map comprises:

updating the respective location of the one or more personal mobility vehicles in the map; and updating a respective label of the one or more personal mobility vehicles in the map based on the respective state; and managing the one or more personal mobility vehicles based on the updated map of the geographic region.

17. A non-transitory computer-readable storage medium including instructions that, when executed by at least one processor of a computing system, cause the computing system to perform:

determining respective states and respective locations of one or more personal mobility vehicles in a geographic region based on sensor data collected by one or more sensor-equipped vehicles;

determining a utilization metric that measures utilization of the one or more personal mobility vehicles in the geographic region based on the respective state and respective location;

generating one or more predictions of utilization for the one or more personal mobility vehicles based on the respective states, the respective locations, and contextual information comprising a date, day of week, or time of day during which the sensor data was collected;

comparing the one or more predictions of utilization with the utilization metric for repositioning the one or more personal mobility vehicles in the geographic region;

providing one or more instructions to reposition the one or more personal mobility vehicles in the geographic region or to remove personal mobility vehicles from the geographic region for fleet balancing purposes; and providing one or more routing instructions to route the one or more sensor-equipped vehicles to reconnaissance along a road on which the one or more personal mobility vehicles are determined to be located based on the sensor data.

18. The non-transitory computer-readable storage medium of claim 17, wherein the instructions further cause the computing system to perform:

determining an issue associated with a designated location in the geographic region based on the sensor data; and providing information associated with the issue to a transportation management system, wherein the transportation management system sends out notifications to reposition the one or more personal mobility vehicles based on the information.

19. The non-transitory computer-readable storage medium of claim 18, wherein the instructions further cause the computing system to perform:

providing one or more instructions to the one or more sensor-equipped vehicles for routing through a portion of the geographic region to gather sensor data in the portion of the geographic region.

20. The non-transitory computer-readable storage medium of claim 19, wherein the instructions further cause the computing system to perform:

updating a map of the geographic region based on the sensor data, wherein the updating the map comprises:

updating the respective location of the one or more personal mobility vehicles in the map; and updating a respective label of the one or more personal mobility vehicles in the map based on the respective state; and managing the one or more personal mobility vehicles based on the updated map of the geographic region.

* * * * *